US006819448B2

(12) United States Patent
William et al.

(10) Patent No.: US 6,819,448 B2
(45) **Date of Patent: *Nov. 16, 2004**

(54) PRINTER WITH PRINT MODE MASKING PERIODIC CARRIAGE VIBRATION

(75) Inventors: Kenneth R. William, Vancouver, WA (US); Tod S Heiles, Vancouver, WA (US)

(73) Assignee: Hewlett-Packard Development Company, L.P., Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/162,340

(22) Filed: Sep. 28, 1998

(65) Prior Publication Data

US 2001/0043338 A1 Nov. 22, 2001

(51) Int. Cl.[7] .................................................. G06K 15/02

(52) U.S. Cl. ............................ 358/1.5; 347/27; 347/32; 347/37; 347/39; 358/296

(58) Field of Search ........................... 358/1.1, 1.5, 1.8, 358/1.9, 296; 347/40, 41, 42, 43, 39, 27, 32, 37, 9, 1; 400/335; 346/139, 108, 1.1, 76

(56) References Cited

U.S. PATENT DOCUMENTS 4,034,842 A 7/1977 Giacone .................. 400/317.1
4,159,882 A * 7/1979 Sanders, Jr. et al. ........ 400/124
4,459,675 A 7/1984 Bateson et al. ............ 358/1.14
5,592,202 A * 1/1997 Erickson ....................... 347/37
5,914,736 A * 6/1999 Tamura ........................ 347/37
5,924,809 A * 7/1999 Wotton et al. .............. 400/691
5,964,542 A * 10/1999 Ruhe et al. ................. 400/352
5,973,717 A * 10/1999 Kerr et al. .................. 347/234
6,152,626 A * 11/2000 Yanagi et al. ............... 400/279

FOREIGN PATENT DOCUMENTS

| | | |
|---|---|---|
| EP | 0661167 | 7/1995 |
| EP | 0754559 | 1/1997 |
| JP | 63091275 | 4/1988 |
| JP | 2088277 | 3/1990 |

* cited by examiner

*Primary Examiner*—King Y. Poon

(57) ABSTRACT

A shuttle-type printer has a movable carriage to carry and position at least one pen over a printing surface. The printer also has a carriage positioning system coupled to move the carriage at a slew rate in swaths over the printing surface. The carriage positioning system starts the carriage at a starting position for individual swaths. The carriage positioning system implements techniques for masking the effects of periodic vibrations in the printer. According to one technique, the carriage positioning system varies the starting position for the individual swaths. According to a second technique, the carriage positioning system makes multiple passes before advancing the recording media and varies the slew rate for individual passes. The techniques do not eliminate or reduce the vibrations themselves, but mask their effects in the print results that are caused by period vibrations in the printer.

5 Claims, 2 Drawing Sheets

PRINTER WITH PRINT MODE MASKING PERIODIC CARRIAGE VIBRATION

TECHNICAL FIELD

This invention relates to printers, and more particularly, to control systems for printers.

BACKGROUND

Printers experience periodic vibrations that detrimentally impact print quality. Consider, for example, a shuttle-type printer that has a carriage system to move and position print elements (e.g., printheads, replaceable cartridges, etc.) over a printing surface. The carriage system includes a carriage that carries the print elements and a drive assembly that moves the carriage along a rod to position the carriage precisely over the printing surface. Some carriage systems also have anti-rotation rollers or sliders that prevent rotation of the carriage around the rod.

Modern shuttle-type printers, such as inkjet printers, operate at high resolution and position errors as small as 5–10 microns. At this level of precision, vibrations can cause noticeable defects in print quality. While it is desirable to reduce or eliminate such defects, a countervailing design requirement is to improve throughput and printing speed. This requirement typically results in higher carriage velocities, which unfortunately makes it more difficult to reduce the vibration-induced errors.

The carriage system is a source of many periodic vibrations. The carriage system is a mechanical assembly having a characteristic mass and drive belt stiffness. Energy sources excite a natural frequency in the mechanical assembly. In addition, high accelerations and slew rates in the carriage system result in vibrations of the carriage, the rod, and/or chassis.

The periodic vibrations can cause periodic displacement of dots formed on the recording media that result in noticeable defects in the printed image. Such defects include vertical or diagonal bands of different hues. Color hue is significantly impacted by the amount of overlap of neighboring drops. The magnitude of error required to cause hue defects is proportional to the size of the dot formed on the page. If very small drops (e.g., 8–10 picoliter drops) are deposited on a coarse grid (e.g., 600 dpi or 42-micron spacing), the resulting grid has thin areas of white space between dot rows. Periodic vibrations cause displacement of the dots into the white space, yielding significant and noticeable hue shifts.

The wavelength of the hue bands due to vibrational errors is equal to the carriage slew rate divided by the vibration frequency. The spacing between nozzle columns on the printhead and the spacing between printheads of different colors result in peak error amplitudes for like colors occurring at the same horizontal spacing across the page. The peak amplitudes for different colors occur at different positions across the page, resulting in vertical or nearly vertical bands of different hues.

Ideally, the magnitude of vibrational errors is reduced to a point that hue shifts due to vibrations are imperceptible to the human eye. However, as dot size and resolution are reduced, the magnitude of the errors must also be reduced. The expense and difficulty of reducing vibration amplitude increases substantially at levels below 10 microns. Mechanical solutions, such as stiffened structures, damping, and minimization or isolation of input energy, are effective at reducing vibration amplitude, but often come at a prohibitively high cost and/or contradict high acceleration or slew rate.

Accordingly, there remains a need for a simple and cost-effective approach to reducing print defects caused by periodic vibrations in the printer.

SUMMARY

This invention concerns techniques for masking the effects of periodic vibrations in printers. The techniques do not eliminate or reduce the vibrations themselves, but mask their effects in the print results to reduce the visibility of vibration-induced errors.

In one implementation, a shuttle-type printer has a movable carriage to carry and position at least one pen over a printing surface. The printer also has a carriage positioning system coupled to move the carriage at a slew rate in swaths over the printing surface. The carriage positioning system has a predefined starting position for individual swaths.

According to one technique, the carriage positioning system varies the starting position for the individual swaths. According to a second technique, the carriage positioning system makes multiple passes before advancing the recording media and varies the slew rate for individual passes. Each of these techniques reduces visual artifacts in the print results that are caused by period vibrations in the printer.

DETAILED DESCRIPTION

This invention concerns printers and techniques for masking the effects of periodic vibrations that are manifest in the printed image. Periodic vibrations are a problem for many different types of printers and hence, aspects of this invention are suitable for the different types of printers. For discussion purposes, however, the invention is described in the context of shuttle-type printers having a movable carriage.

Figure 1:
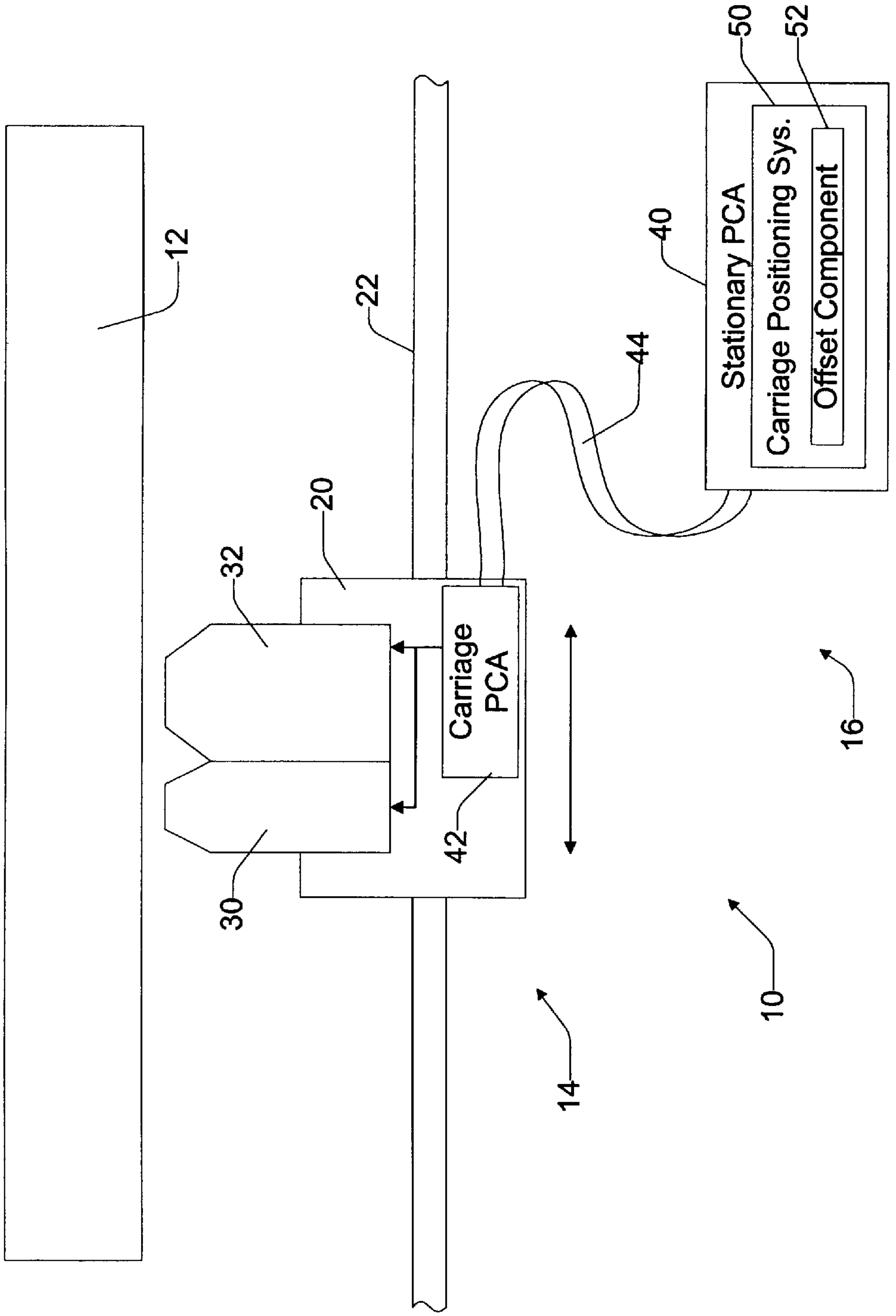
FIG. 1 is a diagrammatic illustration of a portion of shuttle-type printer.

FIG. 1 shows a shuttle-type printer 10 and particularly, the printing mechanism portion of the printer. In this illustration, the shuttle-type printer 10 is configured as an inkjet printer, although other configurations are also possible, such as dot matrix, daisy wheel, thermal, and so forth.

The shuttle-type printer 10 includes a platen 12, a shuttle assembly 14, and a control system 16. The platen 12 is a stationary or rotatable element that supports a recording media during printing. The shuttle assembly 14 includes a carriage 20 slidably mounted on a fixed, elongated rod 22 to move bi-directionally across the platen 12 in reciprocating passes. The shuttle assembly 14 also includes a drive subassembly (not shown), such as a stepper or DC motor mechanically linked to the carriage to mechanically maneuver the carriage 20 back and forth along the rod 22.

The shuttle assembly 14 has one or more inkjet printheads mounted to the carriage 20. Two printheads 30 and 32 are illustrated for explanation purposes. When mounted in the carriage 20, the printheads 30 and 32 are disposed adjacent to, but spaced slightly from, the platen 12. A media feed mechanism (not shown), such as friction rollers or a tractor feed subassembly, advances the recording media through the printer and between the platen 12 and the printheads 30, 32. The carriage 20 carries the printheads 30, 32 in a reciprocating motion over a printing surface. Each print sweep is called a "swath."

According to one type of known construction, the printheads 30, 32 are embodied as replaceable, disposable pens that are removably mounted to the carriage 20. Such pens comprise a self-contained ink supply, a nozzle pattern formed at the pen tip, and a pen integrated circuit (IC) with heating elements (i.e., resistors) and selection logic for those elements. In this configuration, each replaceable pen essentially forms an entire printhead. As used herein, the terms "pen" and "printhead" are substantially interchangeable.

In the illustrated implementation, the control system 16 includes a stationary printed circuit assembly (PCA) 40 mounted to a stationary fixture of the printer 10, such as the frame or housing. The stationary PCA 40 functions as the primary logic or motherboard and controls all non-pen related aspects. The control system 16 further includes a carriage printed circuit assembly (PCA) 42 mounted to the carriage 20 and a conductor 44 interconnecting the stationary PCA 40 to the carriage PCA 42. The carriage PCA 42 controls all pen-related aspects.

Generally, the carriage PCA 42 has an input connector that couples to the conductor cable 44 to receive the data, power, and ground signals from the stationary PCA 40. The carriage PCA 42 also has a pair of pen connectors in the form of conductive contacts that electrically couple to contact pads formed on the pens 30 and 32. The contact pads on the removable pens engage the contacts of the carriage PCA 42 when the pens are installed on the carriage 20.

The stationary PCA 40 sends printing data, power, and ground signals to the carriage PCA 42. The stationary PCA 40 includes I/O circuitry to handle I/O tasks with external devices, such as a host computer and data/control format circuitry to format the data received from the host via the I/O circuitry into a serial bit stream that is sent to the carriage PCA 42 over conductor 44. The stationary PCA 40 also includes a media control circuit to control the printer feed mechanism and panel I/O circuitry to accommodate user interface functions for the printer's key panel and display.

The stationary PCA 40 further includes carriage positioning circuitry 50 for managing the movement and position of the carriage 20 over the recording media. The carriage positioning circuitry 50 moves the shuttle assembly 14 at a selectable velocity, known as the "slew rate", during the printing swaths over the recording media. The carriage positioning circuitry 50 includes an offset component 52 that generates offset values for use in varying selected control parameters, as is described below in more detail.

As noted in the Background, periodic vibrations in the printer are manifest as visually perceptible defects in the print results that tend to occur in approximately the same horizontal locations across a printing swath. One such defect is manifest as vertically aligned bands of different color hues. The carriage positioning circuitry 50 is configured to mask the effects of the periodic vibrations. It does this in one of two ways: (1) varying the starting position of the carriage for individual swaths or (2) varying the slew rate. These masking techniques can also be used together. Both techniques, whether used together or separately, help reduce visual artifacts manifest in print results caused by period vibrations in the shuttle-type printer.

Figure 2:
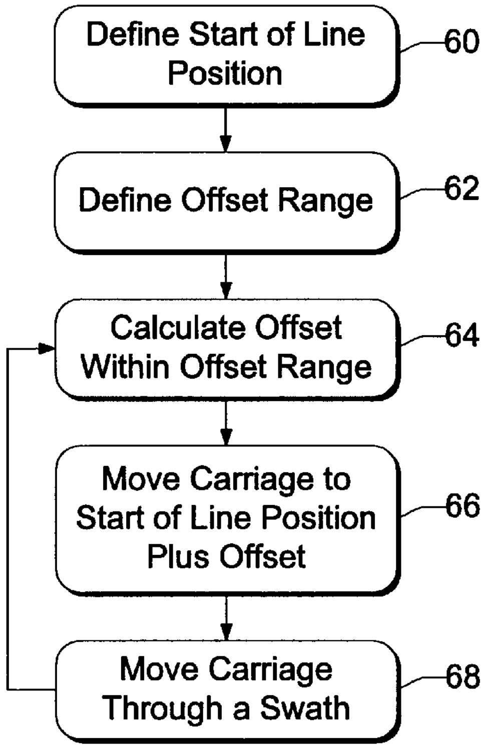
FIG. 2 is a flow diagram showing steps in one printing method that masks errors induced by periodic vibrations.

FIG. 2 shows steps in the first printing method aimed at reducing errors induced by periodic vibrations. Steps 60 and 62 are preliminary steps that are typically performed prior to printing. At step 60, a starting position for the carriage to begin a printing swath is defined. As an example, in the HP 2000C series of ink-jet printers, the carriage positioning circuitry 50 starts and stops the carriage at approximately 17 mm from the last printed dot.

At step 62, an offset range within which the starting position can be varied is defined. Preferably, the offset range is approximately equal to a distance of a fraction of the critical wavelength of the periodic vibrations. For the HP 2000C series of ink-jet printers, the vibrations are at about 70 Hz and critical wavelength is approximately 7.2 mm. Accordingly, a suitable offset is approximately 1.8 mm to 5.4 mm. Offsets up to 10 mm may be used effectively.

At step 64, the offset component 52 computes an offset value that is within the defined offset range. The offset component 52 may arrive at the offset value systematically or randomly. The carriage positioning circuitry 50 then moves the carriage to the starting position plus the offset value (step 66). From this modified starting position, the carriage positioning circuitry 50 moves the carriage through a printing swath (step 68).

Upon concluding the swath, the offset component 52 once again computes an offset value within the defined offset range (step 64) and the carriage positioning circuitry 50 moves the carriage to the defined starting position plus the new offset value (step 66). In this manner, the carriage positioning circuitry systematically or randomly varies the starting position for individual swaths. It is noted that an offset may be calculated between every swath or between sets of swaths.

Varying the starting position dramatically reduces the error visibility of print defects caused by period vibrations because it disrupts the horizontal positions of the vertically aligned hue bands. Moving the carriage additional offset distances has one performance drawback in that it slightly reduces printer throughput because the additional movement consumes time. Accommodating offset distances may also slightly increase product size so that the carriage can move over a slightly larger range. However, the benefit of improved print quality outweighs the performance liability.

Figure 3:
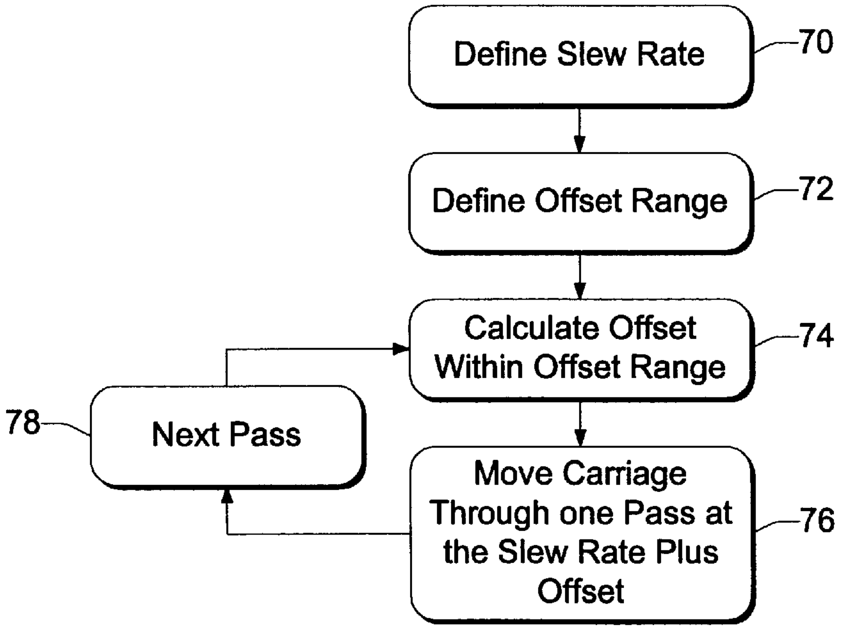
FIG. 3 is a flow diagram showing steps in another printing method that masks errors induced by periodic vibrations.

FIG. 3 shows steps in another printing method aimed at reducing errors induced by periodic vibrations. This method is particularly well suited for multi-pass printing operations in which the carriage makes multiple passes for each swath. Steps 70 and 72 are preliminary steps that are typically performed prior to printing. At step 70, a slew rate for the carriage is defined. Example slew rates are velocities that enable printing of 300 dpi (dots per inch) or 600 dpi.

At step 72, an offset range within which the slew rate can be varied is defined. As an example, for a nominal printing speed of 20 ips, the offset range may be 16–20 ips.

At step 74, the offset component 52 computes an offset value that is within the defined offset range. The offset value may be arrived at using random or systematic techniques. The carriage positioning circuitry 50 then moves the carriage at the defined slew rate plus the offset value for one pass of the multi-pass swath (step 76).

Upon concluding the pass and preparing for the next pass of the multi-pass swath (step 78), the offset component 52 once again computes an offset value within the defined offset range (step 74). The carriage positioning circuitry 50 moves the carriage at the defined slew rate plus the new offset value for the next pass (step 76). In this manner, the carriage positioning circuitry varies the slew rate systematically or randomly for each pass in the multi-pass swath.

The print speeds on different passes are chosen so that a maximum positive error at one location on one pass is canceled by a negative error at this location on another pass. The effectiveness increases with a large number of passes and with an adequately large variation in slew speed from pass to pass. The speed variations are somewhat constrained by the goal of maximizing the overall throughput of the printer.

It is noted that an offset may be calculated between every pass or between sets of passes within a multi-pass swath.

Varying the slew rate dramatically reduces the error visibility of print defects caused by period vibrations. In particular, varying the slew rate translates to dot placement errors on the recording media that vary in frequency from pass to pass. The resulting hue shifts on each pass are no longer vertically aligned and are therefore less visible.

The masking techniques can be implemented in a number of ways. For instance, the steps defined in FIGS. 2 and 3 can be embodied as executable code in the printer operating system, or embedded in a storage medium (e.g., ASIC, ROM, PROM, EPROM, and FPGA). Alternatively, the methods can be hard wired into printer circuitry.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A shuttle type printer comprising:

a movable carriage to carry and position at least one pen over a printing surface; and a carriage positioning system coupled to move the carriage in swaths over the printing surface, the carriage positioning system disrupting horizontal positions of vertical line bands between one or more adjacent printing swaths by:

starting the carriage at a predefined starting position for individual passes of a multi-pass swath, the predefined starting position being a location at which the shuttle type printer begins printing;

varying the predefined starting position within a predetermined range for individual passes to reduce any visual artifacts in print results caused by period vibrations in the shuttle-type printer; and wherein the predetermined range is selected as a function of a distance which is a fraction of a critical wavelength of the vibrations, wherein the fraction is less that one.

2. A printer as recited in claim 1, wherein the carriage positioning system randomly varies the predefined starting position within the predetermined range.

3. A printer as recited in claim 1, wherein the carriage positioning system moves the carriage at a slew rate and varies the slew rate within a predefined offset range for individual passes of the multi-pass swath.

4. In a shuttle-type printer in which a printing mechanism is moved along a recording media in swaths, a method of printing comprising:

moving the printing mechanism to a predefined starting position to begin a first pass of a multi-pass swath;

varying the predefined starting position of the printing mechanism for individual passes of the multi-pass swath, the predefined starting position being varied based on a predetermined range, and wherein varying the predefined starting point disrupts horizontal positions of vertical line bands between one or more adjacent printing swaths; and selecting the predetermined range as a function of a distance which is a fraction of a critical wavelength of a periodic vibration in the printer.

5. A method of printing as recited in claim 4, further comprising:

moving the printing mechanism at a slew rate; and varying the slew rate for individual swaths.

* * * * *